May 23, 1961 F. C. SICKELSMITH ET AL 2,985,724

TELEPHONE SILENCER

Filed May 19, 1959

INVENTORS
LOLA H. SICKELSMITH
F. C. SICKELSMITH

United States Patent Office 2,985,724
Patented May 23, 1961

2,985,724

TELEPHONE SILENCER

Fremont C. Sickelsmith and Lola H. Sickelsmith, College Park, Ga. (both of Rte. 3, Cave Springs Road, Rome, Ga.)

Filed May 19, 1959, Ser. No. 814,306

4 Claims. (Cl. 179—146)

This invention relates to telephones and more particularly to an accessory therefor.

It is an object of the present invention to provide an attachment for telephones which will enable the handset to be placed thereupon temporarily, which will completely silence any sounds entering or emanating from the handset.

Another object of the present invention is to provide an attachment for telephones of the above type that can be readily attached to all existing equipment without permanent damage or alteration thereof.

Other objects of the invention are to provide a phone silencer bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which.

Figures 1, 2:
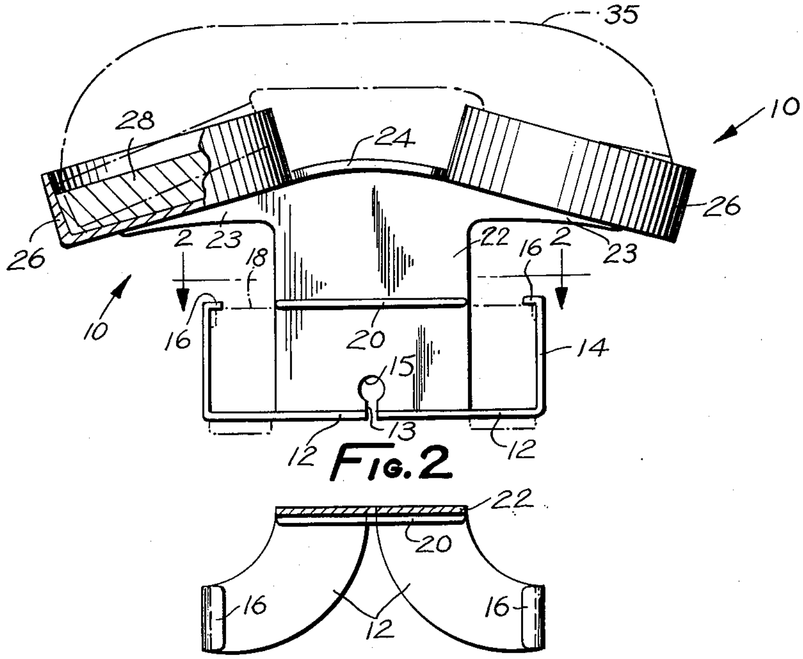
Figure 1 is a front elevational view of a phone silencer attachment made in accordance with the present invention, showing the manner in which it is attached to a tele-telephone illustrated in phantom lines.
Figure 2 is a transverse cross sectional view taken along line 2—2 of Figure 1.
Figure 3:
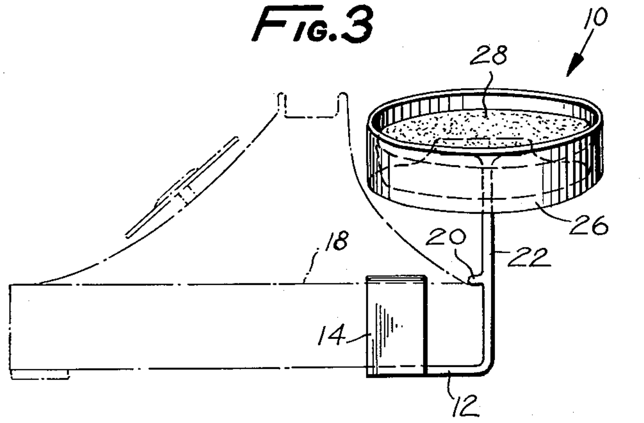
Figure 3 is a side elevational view of the assembly shown in Figure 1.
Figure 4:
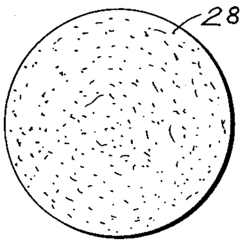
Figure 4 is an enlarged plan view of a cushion element forming a part of the present invention.

Referring now more in detail to the drawing, a telephone handset silencer 10 made in accordance with the present invention is shown to include a bracket 22 having a pair of perpendicularly outwardly and outwardly diverging base plates 12 which extend beneath and forwardly of the base of a conventional telephone. The frontmost free ends of the arms 12 are turned upwardly to form clamp plates 14 having inwardly directed terminal portions 16 that overlie the upper marginal edge 18 of the telephone base and thus clampingly engage therewith. A forwardly facing rib 20 extending transversely across the bracket 22 also overlies the upper peripheral edge 18 of the telephone base, thus maintaining the parts in proper assembled relationship.

The rearwardly converging base arms 12 of the clamp device converge toward a vertical slot 13 in the bracket 22 to provide communication with a keyhole slot 15 through which the lead wire of a telephone may extend.

The uppermost end of the bracket 22 is provided with an angularly related and symmetrically arranged flange

24 that overhangs outwardly extending arms 23, and upon which a pair of shallow cups 26 are supported. The interior of each such cup 26 is filled with a cushion pad 28 that is recessed below the uppermost level of each such cup.

It will now be recognized that this device is readily applied to the existing telephone assembly by sliding the upwardly extending arms 14 forwardly from the rear end of the telephone so that the terminal lugs 16 and cross rib 20 overlies the uppermost peripheral portion 18 of the telephone. Thus, after removing the handset 35 from the telephone base, the mouth and ear pieces thereof may be conveniently placed within the provided cups 26, so that the pads 28 may effectively silence any sounds passing into or out of the telephone handset.

As these units can be manufactured at a relatively low cost, various business concerns can use them for advertising purposes, instead of calendars or cards ordinarily used for that purpose.

While various changes may be made in the detail construction, it shall be understood that such changes shall be within the spirit and scope of the present invention as defined by the appended claims.

What we claim as new and desire to protect by Letters Patent of the United States is:

1. A silencer for a telephone hand set having a mouthpiece at one end and an ear piece at the opposite end, said silencer comprising, in combination, a bracket, clamp means detachably mounting said bracket upon the base of a telephone, and a pair of sound damping pads carried in spaced apart relationship upon said bracket for facing contact with said mouthpiece and ear piece of the telephone hand set placed thereupon, said clamp means comprising a plurality of angularly related clamp arms projecting forwardly outwardly and upwardly from said bracket and encompassing the sides of a telephone base slidably received therebetween.

2. The combination according to claim 1, wherein said bracket comprises a substantially flat plate for abutment with the rear end of a telephone base, and said angularly related arms of said clamp means extend laterally outwardly and forwardly of said plate for sliding engagement with the sides of the telephone base forwardly of said bracket plate.

3. The combination according to claim 2, further comprising a pair of shallow cups carried upon the uppermost edge of said bracket plate in laterally spaced relationship, said cups lying in angularly related planes defining an obtuse angle therebetween, and the distance between said cups, corresponding generally to the distance between the ear and mouth pieces of a telephone handset.

4. The combination according to claim 3, further comprising a sound absorbing pad secured within each one of said cups, and each said pad being recessed downwardly below the uppermost open edge of each said cup.

References Cited in the file of this patent

UNITED STATES PATENTS

| | | |
|---|---|---|
| 2,188,958 | Richardson et al. | Feb. 6, 1940 |
| 2,484,450 | Fisher | Oct. 11, 1949 |
| 2,546,229 | McCloskey et al. | Mar. 27, 1951 |
| 2,639,334 | Fleming | May 19, 1953 |